(12) United States Patent
Logan et al.

(10) Patent No.: US 7,354,499 B1
(45) Date of Patent: Apr. 8, 2008

(54) METHOD FOR MAKING A LUBRICATING FAST SETTING EPOXY COMPOSITION

(75) Inventors: Robert J. Logan, Houston, TX (US); Teresa Leigh Barr, Hood River, OR (US)

(73) Assignee: Zap-Lok Pipeline Systems, Inc., Cambridge, MA (US)

( * ) Notice: Subject to any disclaimer, the term of this patent is extended or adjusted under 35 U.S.C. 154(b) by 0 days.

(21) Appl. No.: 11/760,587

(22) Filed: Jun. 8, 2007

Related U.S. Application Data

(63) Continuation-in-part of application No. 11/612,376, filed on Dec. 18, 2006, and a continuation-in-part of application No. 11/612,362, filed on Dec. 18, 2006, and a continuation-in-part of application No. 11/612,349, filed on Dec. 18, 2006.

(51) Int. Cl.
*B29C 65/52* (2006.01)
*C08L 63/00* (2006.01)
*C08K 3/04* (2006.01)
*C08K 3/20* (2006.01)
*C08K 3/22* (2006.01)
*C08K 3/34* (2006.01)
*C08K 3/36* (2006.01)
*B32B 27/38* (2006.01)

(52) U.S. Cl. ............... 156/294; 156/293; 156/330; 523/457; 523/466; 523/468; 525/523; 525/529; 525/533

(58) Field of Classification Search ............ None
See application file for complete search history.

(56) References Cited

U.S. PATENT DOCUMENTS

| | | | | |
|---|---|---|---|---|
| 4,948,678 A | * | 8/1990 | Shindou et al. | ............. 428/623 |
| 5,712,039 A | * | 1/1998 | Marhevka et al. | .......... 428/414 |

* cited by examiner

*Primary Examiner*—Michael J Feely
(74) *Attorney, Agent, or Firm*—Buskop Law Group, PC; Wendy Buskop

(57) ABSTRACT

A method for making a lubricating fast-setting epoxy compound comprising: mixing under vacuum dispersion a first micro-crystalline filler, a first talc, and a titanium oxide into a hardenable epoxide containing liquid forming an epoxy base. A second micro-crystalline filler, a second talc, and a hydrocarbon resin are mixed forming an accelerator mixture. A methylamino accelerator is mixed into the accelerator mixture forming an epoxy accelerator. Substantially equal amounts of the epoxy base and the epoxy accelerator are mixed to form the lubricating fast-setting epoxy compound having a high lubricity and a curing time ranging from two minutes to twelve minutes. Adjusting the mixing speed and temperature of the epoxy base, the accelerator mixture, and the epoxy accelerator is contemplated to promote homogeneity. The epoxy base can also include a flatting agent. The epoxy accelerator can also include a modified aliphatic amine, an acrylic resin, a coloring agent, or combinations thereof.

25 Claims, No Drawings

METHOD FOR MAKING A LUBRICATING FAST SETTING EPOXY COMPOSITION

CROSS REFERENCE TO RELATED APPLICATIONS

This patent application is a continuation-in-part application that claims the benefit, under 35 USC §120, of the prior non-provisional applications having Ser. No. 11/612,376, filed Dec. 18, 2006, Ser. No. 11/612,362, filed Dec. 18, 2006, and Ser. No. 11/612,349, filed Dec. 18, 2006. The prior co-pending non-provisional applications are incorporated by reference along with their appendices.

FIELD

The present embodiments relate to a method for making a lubricating fast-setting epoxy compound.

BACKGROUND

A need exists for a method for making a fast-setting epoxy compound capable of curing rapidly, in as two to twelve minutes, to allow the use of coated materials, such as subsea pipe joints, very soon after application rather than waiting hours for conventional epoxy to cure.

A further need exists for a method for making a fast-setting epoxy compound capable of lubricating surfaces, such as steel pipes, to enable connections and interference fits without galling or bending the material, then curing rapidly to avoid separation of connected materials, that is resistant to blushing and bubbling, to allow for even and smooth application to surfaces.

An additional need exists for a method for making a fast-setting epoxy compound that cures rapidly at ambient temperatures and high humidity, and is therefore ideal for marine and subsea use.

A need exists for a method for making a fast-setting epoxy compound that is easy, efficient, and cost effective.

The present embodiments meet these needs.

DETAILED DESCRIPTION OF THE EMBODIMENTS

Before explaining the present embodiments in detail, it is to be understood that the embodiments are not limited to the particular embodiments and that they can be practiced or carried out in various ways.

One advantage of the present method is that the present method produces a fast-setting epoxy compound that can provide lubrication to surfaces, especially metal surfaces, such as those of steel pipes. Through suspension of a micro-crystalline filler, such as graphite, in the composition, high lubricity is achieved, while the micro-crystalline filler simultaneously fills porous surfaces such as those of steel pipes.

The fast-setting epoxy compound is that the epoxy compound can cure in as little as two to twelve minutes. Conventional epoxies can require multiple hours to fully cure. This fast-curing nature allows connections formed using lubricated surfaces, such as interference fits in metal pipe joints, to be assembled and used rapidly. An interference fit or another connection can become disassembled during use if the lubricating compound used to form the connection has not yet fully cured.

Conventional epoxies also do not combine a suspended micro-crystalline filler with a fast curing time.

Still another advantage of the present method is that the present method produces a fast-setting epoxy able to cure at ambient temperatures in high humidity conditions. Conventional epoxies often do not cure, or cure more slowly in the presence of moisture or in very high or low ambient temperatures, while the epoxy produced by the present method is extremely resistant to moisture and blushing. This moisture resistance helps to inhibit bubbling, allowing the fast-setting epoxy compound to be applied smoothly and evenly to surfaces.

The present method is advantageous due to its substantially simple nature. Using inexpensive and easily acquired equipment, such as mixers and substantially airtight containers, a combination of uniquely effective ingredients can be efficiently combined, producing a fast-setting epoxy having high lubricity that cures rapidly, leaving previously lubricated equipment ready for use in as two to twelve minutes.

A first micro-crystalline filler, a first talc, and a titanium oxide are mixed into a hardenable epoxide containing liquid to form an epoxy base. The mixing can be done in a special vacuum tank having impellers and performed under vacuum dispersion. A flatting agent can also be mixed into the hardenable epoxide containing liquid.

The vacuum on the vacuum tank can be started before starting the impellers are started, thereby evacuating air before the mixing causes any air entrapment. After high vacuum is achieved, both impellers can be started, thus providing rapid dispersion with no air entrapment.

The impellers can be started at a low speed and gradually increased slowly to increase circulation. The impellers can be increased the to maximum dispersing speed while staying within the limitation of the impeller motor amperage rating. The speeds of both impeller shafts can be charged simultaneously and adjusted slowly to reach the optimum point of flow and dispersion without creating cavitations in the epoxy base.

If the mixing creates a temperature approaching or exceeding 160 degrees centigrade, which can denature the ingredients, the mixing can be slowed or stopped to reduce the temperature. After the epoxy base has reached a satisfactory degree of dispersion, both impellers can continue mixing until a homogenous state is reached. After the homogenous state is reached, the vacuum tanks can be sealed to prevent air from contacting the epoxy base until it is to be mixed with the epoxy accelerator.

A second micro-crystalline filler, a second talc, and a hydrocarbon resin can be mixed to form an accelerator mixture. The accelerator mixture can be mixed using the same procedure by which the epoxy base was mixed. A modified aliphatic amine, an acrylic resin, a coloring agent, or combinations thereof can also be mixed into the first accelerator mixture.

A methylamino accelerator can then be mixed into the accelerator mixture forming the epoxy accelerator, which can also be sealed to prevent contact with air until the epoxy accelerator is to be mixed with the epoxy base.

When ready for use, substantially equal amounts of the epoxy base and the epoxy accelerator can be mixed, forming a lubricating fast-setting epoxy compound having a high lubricity, sufficient to press two segments of steel pipe in an interference fit using a hydraulic press without damaging the pipe segments or galling the metal. The lubricating fast-setting epoxy compound further has a curing time ranging from two to twelve minutes, allowing sufficient time for the compound to be applied to lubricate a surface and utilized, then curing very shortly thereafter.

The mixing can be done using a banbury mixer, a high shear mixer, a dispersion machine, a stone mill, a ball mill, a roller mill, a vacuum tank having at least one impeller, or combinations thereof. In a preferred embodiment, a vacuum tank operably connected to a dispersion machine having a low speed impeller and a high speed impeller is used.

It is contemplated that the combination of multiple particulates and ground materials throughout the present method can cause agglomerates and lumps to form, which cannot be dispersed through conventional stirring and require use of a dispersion machine or a similar apparatus. Dispersion machines typically include at least one impeller, which not only mixes components, but breaks apart adherent particles using powerful mechanical force. Deagglomerated particles that are dispersed by the impeller often collide with one another at high speeds, further dispersing and deagglomerating any non-homogeneous portions of the mixture.

The speed of the one or more impellers can be altered to provide the necessary mechanical force to promote homogeneity in each mixture. Additionally, the speed of the impellers can cause the temperature of a mixture to increase, further promoting homogeneity. It is contemplated that a dispersion machine can produce a homogeneous epoxy base or epoxy accelerator in forty minutes or less.

In an embodiment, a sixty cycle dispersion machine having motors which vary from one horsepower to 300 horsepower, with a voltage of 230, 460, or lower can be used. The dispersion machine can have both a low speed and a high speed impeller connected to separate shafts.

The mixing can be done using constant agitation, variable agitation, intermittent agitation, gradually increasing agitation, or combinations thereof.

It is contemplated that the epoxy base, the accelerator mixture, the epoxy accelerator, or combinations thereof can be heated during mixing, to a temperature ranging from about 10 degrees centigrade to about 160 degrees centigrade, to promote homogeneity. The mixing can be slowed or stopped to prevent the temperature from exceeding 160 degrees centigrade.

The mixing speed can be adjusted as needed to promote or maintain homogeneity and produce small amounts of heat as needed. The temperature can also be adjusted as needed to promote homogeneity.

The lubricating fast-setting epoxy compound is formed by mixing substantially equal amounts of an epoxy base with an epoxy accelerator.

The epoxy base contains a first micro-crystalline filler, a first talc, a hardenable epoxide containing liquid, and a titanium oxide. The epoxy base can also include a flatting agent.

The first micro-crystalline filler of the epoxy base can be crystalline silica, sodium silica, crystalline cellulose, amorphous silica, clay, calcium carbonate, graphite, carbon black, powdered copper, powdered aluminum, powdered barite, fumed silica, fused silica, and combinations thereof.

A preferable first micro-crystalline filler is a mixture of crystalline silica and graphite, due to the added lubricity provided by graphite, as well as the ability of graphite to act as a filler for porous surfaces, such as steel. However, other micro-crystalline fillers can also provide lubricity and fill porous surfaces.

It is contemplated that the first micro-crystalline filler can comprise from about 0.01 to about 35 percent of the epoxy base by weight, with a preferred weight percent of 24%.

The first talc, present in the epoxy base, is contemplated to be magnesium silica, and can be a platy talc. Although talc is hydrophobic, it disperses easily in both aqueous and solventborne coatings. Due to its shape, talc has a beneficial effect on rheology and contributes to improved brushability, leveling, and sag resistance. Talc is also generally self-suspending in epoxy vehicles and assists in keeping other pigments suspended. Further, talc is readily redispersed.

Talc improves the toughness and durability of the fast-setting epoxy compound. Talc plates can align with the flow of an epoxy coating to be parallel to the substrate after the epoxy cures, creating a physical barrier to the transmission of moisture, thereby improving water and humidity resistance. The reinforcement provided by platy talc can improve the resistance of the cured epoxy to cracking or rupture due to stretching and flexing, thus better insulating the epoxy from the environment.

The barrier properties, alkaline pH, and reinforcement provided by talc contributes to inhibition of corrosion. Micronized talcs, such as 6 Hegman and finer, can be used for titanium dioxide extension, provide good low angle sheen, and good burnishing resistance. Macrocrystalline talcs can also be used as a flatting agent.

It is contemplated that the first talc can comprise from about 0.5 to about 25 percent of the epoxy base by weight, with a preferred weight percent of 18%.

The hardenable epoxide containing liquid of the epoxy base is used as an epoxy resin and can be selected from the group commonly known as bisphenol A (epichlorohydrin). The hardenable epoxide containing liquid can include a diglycidyl ether of 1,4-butanediol, a diglycidyl ether of neopentylglycol, a diglycidyl ether of cyclohexane dimethanol, and combinations thereof.

It is contemplated that the hardenable epoxide containing liquid can comprise from about 50 to about 90 percent of the epoxy base by weight, with a preferred weight percent of approximately 54%.

Titanium oxide, present in the epoxy base, can be a titanium dioxide, a titanium trioxide, or combinations thereof, preferably titanium dioxide. Titanium dioxide can be obtained from Huntsman Tioxide under the trade names of TR60 and TR93. Titanium dioxide can be used both as a dispersion agent and a pigment.

It is contemplated that titanium dioxide can comprise from about 0.01 to about 15 percent of the epoxy base by weight, with a preferred weight percent of 4%.

If the epoxy base includes a flatting agent, the flatting agent can be titanium dioxide, magnesium silica, zinc, amorphous silica, or combinations thereof. A preferred flatting agent is zinc, due to zinc's added function as an anti-corrosive agent.

It is contemplated that the flatting agent can comprise from about 0.001 to about 10 percent of the epoxy base by weight, with a preferred weight percent of 1%.

The epoxy accelerator contains a second micro-crystalline filler, a second talc, a methylamino accelerator, and a hydrocarbon resin. The epoxy accelerator can also include a modified aliphatic amine, an acrylic resin, a coloring agent, or combinations thereof.

The second micro-crystalline filler, present in the epoxy accelerator can be crystalline silica, sodium silica, crystalline cellulose, amorphous silica, clay, calcium carbonate, graphite, carbon black, powdered copper, powdered aluminum, powdered barite, fumed silica, fused silica, and combinations thereof.

A preferred second micro-crystalline filler can be crystalline silica. Crystalline silica is a thixotropic additive which, when dispersed, increases viscosity, imparts thixotropic behavior, and adds anti-sag and anti-setting characteristics.

Crystalline silica can be obtained from the Degussas Corporation under the trade name Aerosil 300.

Synthetic fused silica is an alternative preferred second micro-crystalline filler. Synthetic fused silica is made from a silica-rich chemical precursor, resulting in a transparent amorphous solid with an ultra-high purity and excellent optical transmission.

It is contemplated that the second micro-crystalline filler can comprise from about 20 to about 50 percent of the epoxy accelerator by weight, with a preferred weight percent of 33%.

The second talc, present in the epoxy accelerator, is contemplated to be magnesium silica, and can be a platy talc, a micronized talc, such as 6 Hegman or finer, a macrocrystalline talc, or anther talc. The second talc can be the same type of talc as the first talc, or a different kind of talc.

It is contemplated that the second talc can comprise from about 10 to about 30 percent of the epoxy accelerator by weight, with a preferred weight percent of 16%.

The methylamino accelerator of the epoxy accelerator can be a dimethylamino accelerator, a trimethylamino accelerator, or similar accelerators. The first methylamino accelerator can be dimethylaminoethanol, dimethylethanolamine, n,n,-dimethylaminoethanol, 2-(dimethylamino) ethanol, N,N,-dimethyl-2-hydroxyethylamine, triethanolamine, piperazine, n-aminoethylpiperazine, 2-4-6 Tri(dimethylaminomethyl) phenol, and combinations thereof.

A preferred methylamino accelerator is 2-4-6 Tri(dimethylanimomethyl) phenol.

It is contemplated that the methylamino accelerator can comprise from about 0.01 to about 60 percent of the epoxy accelerator by weight, with a preferred weight percent of 45%.

The hydrocarbon resin of the epoxy accelerator can be a polyalphamethylstyrene, such as those obtainable from the Aldrich Chemical Company.

Polyalphamethylstyrenes undergo specific chain scission with breakage occurring only at its ends. Polyalphamethylstyrenes depolymerize to become the constituent monomer present in the epoxy accelerator.

It is contemplated that the hydrocarbon resin can comprise from about 0.001 to about 15 percent of the epoxy base by weight, with a preferred weight percent of approximately 5%.

If the epoxy accelerator includes a modified aliphatic amine, the modified aliphatic amine can be an aliphatic polyaminoaminde. Aliphatic polyaminoamides are room temperature reacting curing agents derived from aliphatic amines that have been modified to reduce their vapor pressure, thereby reducing their corrosiveness. The modifications optimize the hardness, reactivity, handling time, and carbonation resistance of the aliphatic amines.

Aliphatic polyaminoamides exhibit high reactivity, low viscosity, and excellent resistance to organic acids and solvents with good adhesion to concrete and steel. Aliphatic polyaminoamides are available from Air Products under the Tradename of Anacamine 2423.

The aliphatic polyaminoamide can be a cycloaliphatic amine which can provide improved resistance to aqueous solutions, solvents, and mineral acids comparable to an aromatic amine cured composition. Cycloaliphatic curing agents provide good color stability, superior resistance to carbamation, superior chemical resistance, and good water spotting and amine blush properties.

Aliphatic polyaminoamides are preferred due to exhibiting a rapid cure time at room temperature in the presence of humidity. Aliphatic polyaminoamides can be used to cure the fast-setting epoxy composition by reacting with epoxide groups or promoting self-polymerization of the epoxy by catalytic action.

It is contemplated that the modified aliphatic amine can comprise from about 20 to about 50 percent of the epoxy accelerator by weight, with a preferred weight percent of 35%.

If the epoxy accelerator includes an acrylic resin, the acrylic resin is contemplated to be a glassy thermoplastic, which can be used in coating, adhesives, and numerous thermoplastic or thermosetting polymers or copolymers of acrylic acid, methacrylic acid, esters of these acids, or acrylonitrile, used to produce paints, synthetic rubbers, and lightweight plastics.

The acrylic resin can comprise from about 0.001 to about 10 percent of the epoxy accelerator by weight, with a preferred weight percent of 0.85%.

If the epoxy accelerator includes a coloring agent, the coloring agent can be a phthalocyanine, though use of other coloring agents is also contemplated.

The phthalocyanine can be a metal phthalocyanine, such as copper phthalocyanine, gold phthalocyanine, titanium phthalocyanine, cobalt phthalocyanine, and combinations thereof. A dispersion of copper phthalocyanine is preferred. Copper phthalocyanine is a phthalo blue or green dispersion, which can be used as a pigment. Copper phthalocyanine is advantageous because it does not cause flocculation, which is the aggregation or grouping together of pigment particles, causing a reduction in pigment tinting power. Copper phthalocyanine exhibits a clean tint and good light qualities.

It is contemplated that the phthalocyanine can comprise from about 0.001 to about 10 percent of the epoxy accelerator by weight, with a preferred weight percent of 1%.

While these embodiments have been described with emphasis on the embodiments, it should be understood that within the scope of the appended claims, the embodiments might be practiced other than as specifically described herein.

What is claimed is:

1. A method for joining tubulars comprising: preparing a lubricating fast-setting epoxy composition, applying the lubricating fast-setting epoxy composition to at least a first end of a tubular, and joining the first end of the tubular with an end of another tubular; wherein the preparing comprises:

mixing under vacuum dispersion a first micro-crystalline filler, a first talc, and a titanium oxide into a hardenable epoxide containing liquid, forming an epoxy base;

mixing under vacuum dispersion a second micro-crystalline filler, a second talc, and a hydrocarbon resin, forming an accelerator mixture;

mixing under vacuum dispersion a methylamino accelerator into the accelerator mixture, forming an epoxy accelerator;

mixing substantially equal amounts of the epoxy base with the epoxy accelerator at an ambient temperature, forming the lubricating fast-setting epoxy composition having a high lubricity and a curing time ranging from two minutes to twelve minutes at an ambient temperature.

2. The method of claim 1, further comprising mixing under vacuum dispersion a flatting agent into the hardenable epoxide containing liquid.

3. The method of claim 2, wherein the flatting agent is selected from the group consisting of: titanium dioxide, magnesium silica, zinc, amorphous silica, and combinations thereof.

4. The method of claim 1, further comprising mixing under vacuum dispersion a modified aliphatic amine, an acrylic resin, a coloring agent, or combinations thereof into the accelerator mixture.

5. The method of claim 4, wherein the modified aliphatic amine is an aliphatic polyaminoamide.

6. The method of claim 5, wherein the aliphatic polyaminoamide is a cycloaliphatic amine.

7. The method of claim 4, wherein the acrylic resin is a thermoplastic.

8. The method of claim 4, wherein the coloring agent is a phthalocyanine.

9. The method of claim 8, wherein the phthalocyanine is a metal phthalocyanine.

10. The method of claim 9, wherein the metal phthalocyanine is copper phthalocyanine, gold phthalocyanine, titanium phthalocyanine, cobalt phthalocyanine, or combinations thereof.

11. The method of claim 1, wherein the mixing to form the epoxy base, the mixing to form the accelerator mixture, the mixing to form the epoxy accelerator, the mixing to form the lubricating fast-setting epoxy composition, or combinations thereof is done using a banbury mixer, a high shear mixer, a dispersion machine, a stone mill, a ball mill, a roller mill, a vacuum tank operably in communication with a dispersion machine having at least one impeller, or combinations thereof.

12. The method of claim 1, wherein the mixing to form the epoxy base, the mixing to form the accelerator mixture, the mixing to form the epoxy accelerator, the mixing to form the lubricating fast-setting epoxy composition, or combinations thereof is performed using constant agitation, variable agitation, intermittent agitation, gradually increasing agitation, or combinations thereof.

13. The method of claim 1, further comprising heating the epoxy base, the accelerator mixture, the epoxy accelerator, or combinations thereof during mixing to a temperature ranging from 10 degrees centigrade to 160 degrees centigrade to promote homogeneity.

14. The method of claim 1, further comprising slowing the mixing to prevent the temperature of the epoxy base, the accelerator mixture, the epoxy accelerator, or combinations thereof from exceeding 160 degrees centigrade.

15. The method of claim 1, wherein the first micro-crystalline filler is selected from the group consisting of: crystalline silica, sodium silica, crystalline cellulose, amorphous silica, clay, calcium carbonate, graphite, carbon black, powdered copper, powdered aluminum, powdered barite, fumed silica, fused silica, and combinations thereof.

16. The method of claim 1, wherein the first talc is a platy talc.

17. The method of claim 1, wherein the hardenable epoxide containing liquid is selected from the group consisting of: an epichlorohydrin, a diglycidyl ether of 1,4-butanediol, a diglycidyl ether of neopentylglycol, a diglycidyl ether of cyclohexane dimethanol, and combinations thereof.

18. The method of claim 1, wherein the titanium oxide is titanium dioxide, titanium trioxide, or combinations thereof.

19. The method of claim 1, wherein the second micro-crystalline filler is selected from the group consisting of: crystalline silica, sodium silica, crystalline cellulose, amorphous silica, clay, calcium carbonate, graphite, carbon black, powdered copper, powdered aluminum, powdered barite, fumed silica, fused silica, and combinations thereof.

20. The method of claim 1, wherein the second talc is a platy talc.

21. The method of claim 1, wherein the methylamino accelerator is a dimethylamino accelerator, a trimethylamino accelerator, or combinations thereof.

22. The method of claim 1, wherein the methylamino accelerator is selected from the group consisting of: dimethylaminoethanol, dimethylethanolamine, n,n,-dimethylamino ethanol, 2-(dimethylamino)ethanol, N,N,-dimethyl-2-hydroxyethylamine, 2,4,6 Tri(dimethylaminomethyl) phenol, and combinations thereof.

23. The method of claim 1, wherein the hydrocarbon resin is a polyalphamethylstyrene.

24. A lubricating fast-setting epoxy composition made by a process comprising:
  forming an epoxy base by mixing under vacuum dispersion: from 0.01 weight percent to 35 weight percent of a first micro-crystalline filler; from 0.50 weight percent to 25 weight percent of a first talc; from 0.01 weight percent to 15 weight percent of a titanium oxide; and from 50 weight percent to 90 weight percent of a hardenable epoxide containing liquid;
  controlling the mixing under vacuum dispersion to maintain a temperature for the epoxy base below 160 degrees centigrade;
  forming an accelerator mixture by mixing under vacuum dispersion: a second micro-crystalline filler; a second talc; and a hydrocarbon resin;
  controlling the mixing under vacuum dispersion to maintain a temperature for the accelerator mixture below 160 degrees centigrade;
  mixing under vacuum dispersion into the accelerator mixture a methylamino accelerator, forming an epoxy accelerator; wherein the epoxy accelerator comprises: from 20 weight percent to 50 weight percent of a second micro-crystalline filler; from 10 weight percent to 30 weight percent of a second talc; from 0.01 weight percent to 60 weight percent of a methylamino accelerator; and from 0.001 weight percent to 15 weight percent of a hydrocarbon resin;
  controlling the mixing under vacuum dispersion to maintain a temperature for the epoxy accelerator below 160 degrees centigrade; and
  mixing substantially equal amounts of the epoxy base with the epoxy accelerator at an ambient temperature, wherein the mixing is controlled to maintain a temperature for the mixture of the epoxy base and epoxy accelerator below 160 degrees centigrade, forming a lubricating fast-setting epoxy composition having a high lubricity and a curing time ranging from two minutes to twelve minutes at an ambient temperature.

25. A lubricating fast-setting epoxy composition comprising:
  an epoxy base comprising:
    from 0.01 weight percent to 35 weight percent of a first micro-crystalline filler;
    from 0.5 weight percent to 25 weight percent of a first talc,
    from 50 weight percent to 90 weight percent of a hardenable epoxide containing liquid; and
    from 0.01 to 15 percent of a titanium oxide; and
  an epoxy accelerator comprising:
    from 20 weight percent to 50 weight percent of a second micro-crystalline filler;

from 10 weight percent to 30 weight percent of a second talc;
from 0.01 weight percent to 60 weight percent of a methylamino accelerator; and
from 0.001 weight percent to 15 weight percent of a hydrocarbon resin,
wherein the lubricating fast-setting epoxy composition cures in a time from 2 minutes to 12 minutes at an ambient temperature.

* * * * *